Figure 10:

No. 822,925. PATENTED JUNE 12, 1906.
F. P. COLLIER.
BRAKE SHOE.
APPLICATION FILED APR. 1, 1905.
3 SHEETS—SHEET 1.
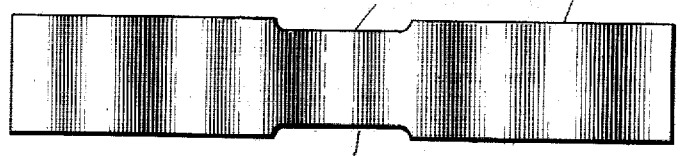
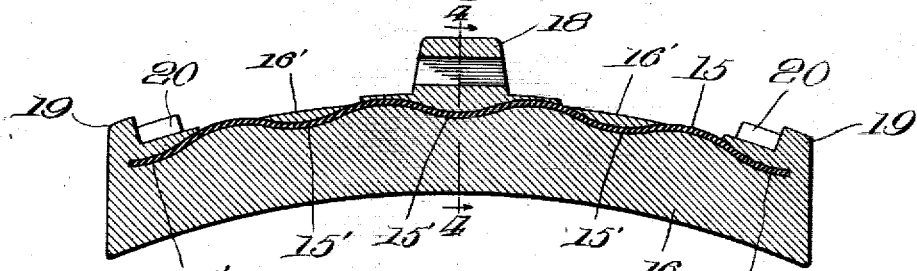
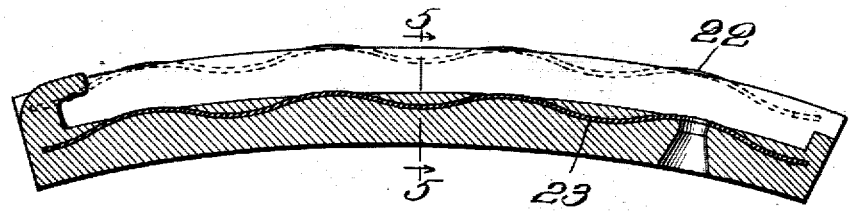
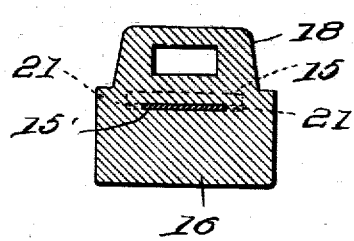
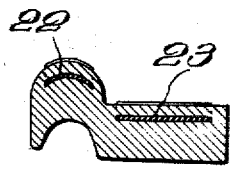
Witnesses:
H. S. Gaither
M. D. Liddie
Inventor:
Frank P. Collier
by Wm. T. Belt
att'y No. 822,925. PATENTED JUNE 12, 1906.
F. P. COLLIER.
BRAKE SHOE.
APPLICATION FILED APR. 1, 1905.
3 SHEETS—SHEET 2.
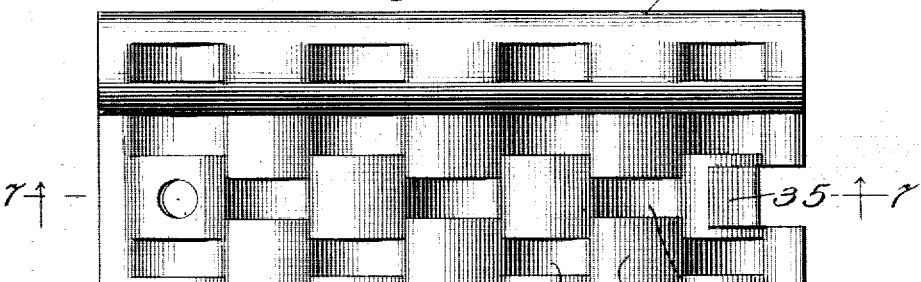
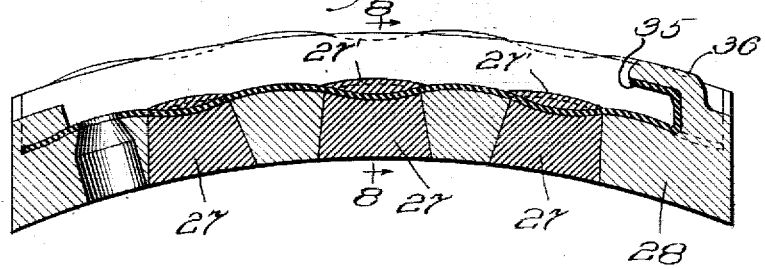
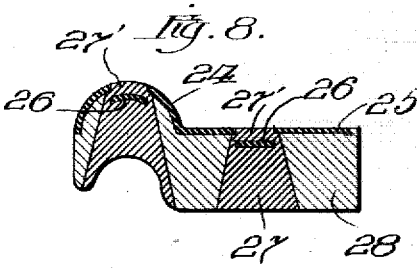
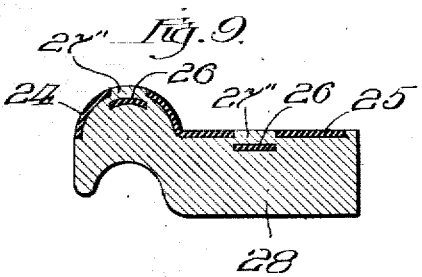
Witnesses:
Frank Blanchard
H. S. Gaither
Inventor:
Frank P. Collier
By Wm. A. Belt
Attorney No. 822,925.　　　　　　　　　　　　PATENTED JUNE 12, 1906.
F. P. COLLIER.
BRAKE SHOE.
APPLICATION FILED APR. 1, 1905.

3 SHEETS—SHEET 3.

Witnesses:
Frank Blanchard
H. S. Paiter

Inventor:
Frank P. Collier
By Wm. P. Bell
　　Attorney

UNITED STATES PATENT OFFICE.

FRANK P. COLLIER, OF WILMETTE, ILLINOIS.

BRAKE-SHOE.

No. 822,925.     Specification of Letters Patent.     Patented June 12, 1906.

Application filed April 1, 1905. Serial No. 253,217.

*To all whom it may concern:*

Be it known that I, FRANK P. COLLIER, a citizen of the United States, residing at Wilmette, in the county of Cook and State of Illinois, have invented new and useful Improvements in Brake-Shoes, of which the following is a specification.

The object of this invention is to strengthen a brake-shoe, to reduce the liability of transverse fracture, and to bind the parts of the shoe together, so that they will not become detached in case of fracture.

The invention can be embodied in car-shoes and locomotive-shoes and in solid and composite shoes of the many different types known in the art, and in the drawings I have shown several embodiments of the invention, referring to which—

Figure 11:
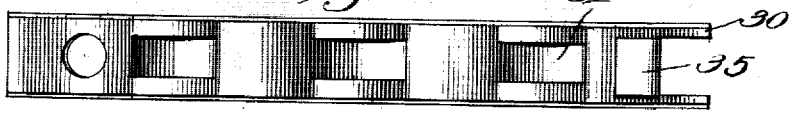
Figure 12:
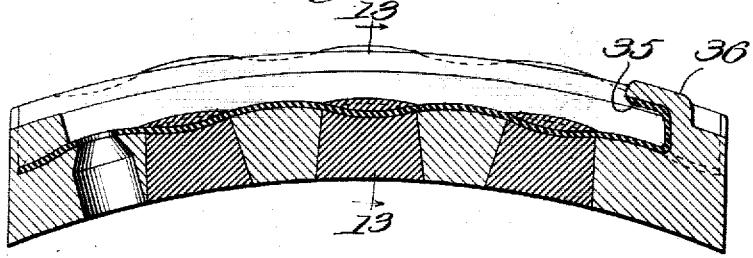
Figure 13:
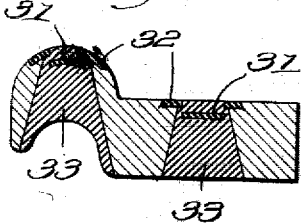
Figure 14:
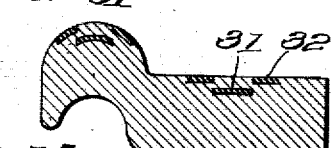
Figure 15:
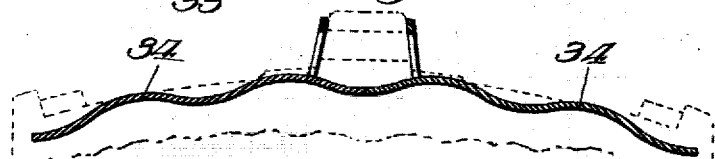

Figure 1 is a plan view of the strengthening-plate for a solid car-shoe. Fig. 2 is a longitudinal sectional view of a solid car-shoe embodying the invention. Fig. 3 is a similar view of a solid locomotive-shoe embodying the invention. Figs. 4 and 5 are tranverse sectional views on the lines 4 4 and 5 5 of Figs. 2 and 3, respectively. Fig. 6 is a plan view of a single plate covering substantially the entire back of a composite locomotive-shoe. Fig. 7 is a longitudinal sectional view of a shoe having the back shown in Fig. 6 and taken on the line 7 7 of Fig. 6. Fig. 8 is a transverse sectional view on the line 8 8 of Fig. 7. Fig. 9 is a similar view without the inserts. Figs. 10 and 11 show the two plates which may be used on a locomotive-shoe in place of the single plate shown in Fig. 6. Fig. 12 is a longitudinal sectional view of a shoe made with the two plates shown in Figs. 10 and 11. Fig. 13 is a transverse sectional view on the line 13 13 of Fig. 12. Fig. 14 is a similar sectional view without the inserts. Fig. 15 shows a corrugated plate on each side of the attaching-lug of a car-shoe.

Referring first to Figs. 1, 2, and 4, I employ a strengthening-plate 15, which may be generically described as "corrugated," meaning thereby a plate which is wrinkled or puckered, so that parts thereof will lie in different planes. This plate is shorter and narrower than the body 16 of the shoe, and when the body is cast thereon the metal will flow over the depressed parts 15' of the plate, on the outer face thereof, as indicated by 16', to lock the plate and body permanently together. I preferably make the plate so that the attaching-lug 18 of the car-shoe, Fig. 2, will be formed above a depression in the plate, and I also prefer that the ends of the plate should be depressed beneath the end lugs 19 and guides 20. The side edges of the plate may be cut out at 21, Fig. 1, to permit a larger quantity of the body metal to form the connection between the attaching-lug and the body. For economy I prefer to use a single plate, Fig. 1, in solid car-shoes, Fig. 2, and I may use a single plate with solid locomotive-shoes, or I may use two plates in the locomotive-shoes, one of these plates 22 being located at the back of the flanged part of the shoe and the other plate 23 being located back of that part of the shoe which contacts with the tread of the wheel, Fig. 5.

In Figs. 6 to 14 of the drawings I have shown another form of corrugated plate in which the plate is slitted and the corrugations are staggered—that is to say, there are alternate raised and depressed parts in a transverse section of the plate. In Figs. 6 to 9 I have shown a single plate of this character for covering approximately the entire back of a locomotive-shoe, and referring thereto it will be observed that the plate 24 has alternate raised parts 25 and depressed parts 26. If a solid body is cast on this style of a corrugated plate, the metal will flow up over the depressed parts in the same manner referred to in connection with Figs. 1 to 5. I may first cast inserts 27 on some or all of these depressed parts 26 and afterward cast the body 28 around the inserts and against the plate, the body metal interlocking with the depressed parts 26 of the plate which do not carry the inserts. The inserts are dovetailed, so that the body will be interlocked therewith, and by reason of the fact that the inserts are locked to the back and the body is locked to the back and also to the inserts a very rigid and secure union of the parts is obtained. The insert metal flows up over the depressed parts of the back, as indicated by 27', Fig. 7, and the body metal flows up over those depressed parts which do not carry inserts, as indicated by 27'', Fig. 9.

In Figs. 10 to 14, inclusive, I have shown two plates for use in a locomotive-shoe in the same manner shown in Figs. 3 and 5, but constructed in the manner shown in Fig. 6, with staggered and alternating raised and depressed parts. The plate 29, Fig. 10, is located at the back of the flanged part of the shoe, and the plate 30, Fig. 11, is located at the back of that part of the shoe which contacts with the tread of the wheel. These two plates may vary more or less in size, as desired, and they are each provided with depressed parts 31 and raised parts 32, and the inserts are cast on some or all of the depressed parts in the manner previously described.

I may embody this invention also in the shoe covered by my Patent No. 787,079, dated April 11, 1905, as shown in Fig. 15. Here the two plates 34 are corrugated like the plate 15, Figs. 1, 2; but I might also make these plates like the plate 24, Fig. 6, to carry inserts. I prefer to dovetail some or all of the edges of the plate, so that the body of the shoe will lock securely with the plate, and in locomotive-shoes I prefer to strike up a hook 35, Figs. 6, 7, 11, and 12, to form a lining and to strengthen the attaching-lug 36.

In solid shoes of cast-iron or other metal and in those shoes which have chilled sections I prefer to use the simpler form of plate illustrated in Figs. 1 to 5, because it is less expensive than the plate shown in Figs. 6 to 14; but when the shoe contains inserts about which the body is cast it is desirable to use the plate illustrated in Figs. 6 to 14 in order that the inserts may first be locked to the plate before the body is cast thereon. The slitted plate shown in Figs. 6 to 14 may be used in the kind of shoes shown in Figs. 1 to 5, if desired. I have shown only two forms of a corrugated plate; but I may use other kinds of corrugated plates in which the corrugations extend diagonally across the plate or longitudinally thereof or in other ways.

A brake-shoe embodying my invention is strong and substantial and will enable the shoe to wear down to the plate itself, and if the body of the shoe should fracture the plate will hold the fractured parts together and prevent them from stripping off or otherwise becoming detached.

Without limiting myself to the exact construction and arrangement of parts herein shown and described, what I claim, and desire to secure by Letters Patent, is—

1. A brake-shoe having a transversely-corrugated plate at or adjacent to the back of the shoe.

2. A brake-shoe having a plate at or adjacent to its back, said plate being slitted and the parts between said slits remaining connected integrally at the ends with the plate and being bent outward.

3. A brake-shoe having a plate at or adjacent to its back, said plate being provided with a plurality of slits arranged in pairs and the part located between each pair of slits remaining connected integrally at its ends with the plate and being bent outward.

4. A brake-shoe having a plate provided with alternate and staggered raised and depressed parts at or adjacent to its back.

5. A brake-shoe comprising a plate at or adjacent to its back, said plate being provided with a plurality of slits and the parts between said slits being bent to provide corrugations in the plate.

6. A brake-shoe comprising a plate at or adjacent to its back, said plate being slitted and provided with alternate and staggered raised and depressed parts.

7. A brake-shoe comprising a transversely-corrugated plate, and a body cast on said plate, the body metal being permitted to flow into the depressed parts on the outer face of the plate to lock the plate and body together.

8. A brake-shoe comprising a corrugated plate, a plurality of inserts carried by said plate, and a body cast on said inserts and plate.

9. A brake-shoe comprising a slitted plate having parts thereof depressed, inserts on said depressed parts, and a body cast on said inserts and plate.

10. A brake-shoe comprising a plate having alternate raised and depressed parts, inserts cast on said depressed parts and extending thereover to form a locking connection with the plate, and a body cast on said inserts and plate.

11. A brake-shoe comprising a slitted plate having alternate and staggered raised and depressed parts, dovetailed inserts cast on some of said depressed parts and extending thereover to form a locking connection with the plate, and a body cast on said inserts and plate and extending over the other depressed parts.

12. A brake-shoe consisting of a steel back having a series of U-shaped straps struck down therefrom and a cast-metal body joined to the back by the metal passing over and around the straps.

FRANK P. COLLIER.

Witnesses:
HYMAN LEWIS,
WM. O. BELT.